Jan. 20, 1925.
A. J. VANCE
1,523,988
VENEER DRIER
Filed Aug. 1, 1924  2 Sheets-Sheet 1
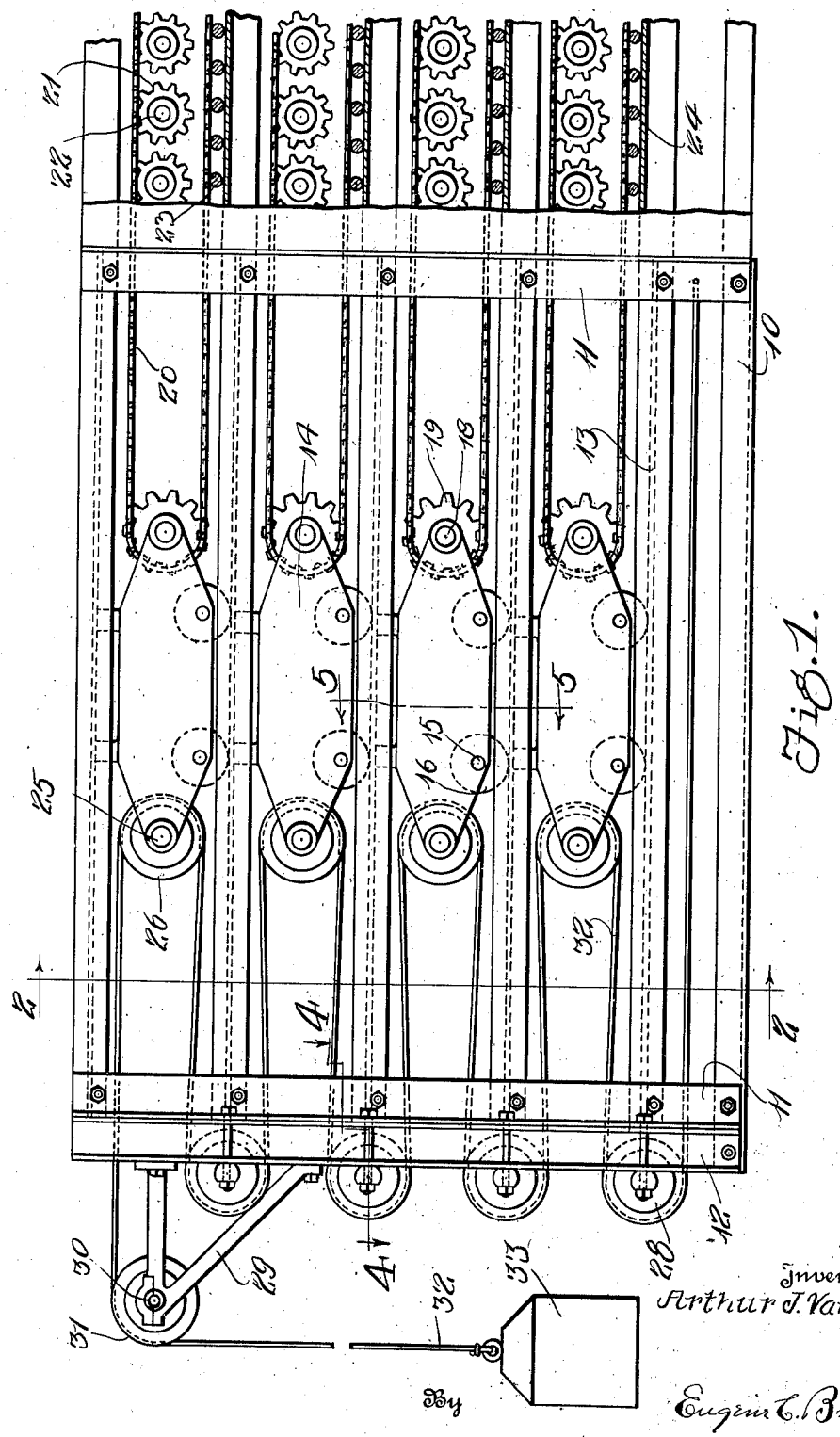

Jan. 20, 1925.
A. J. VANCE
VENEER DRIER
Filed Aug. 1, 1924
1,523,988
2 Sheets-Sheet 2
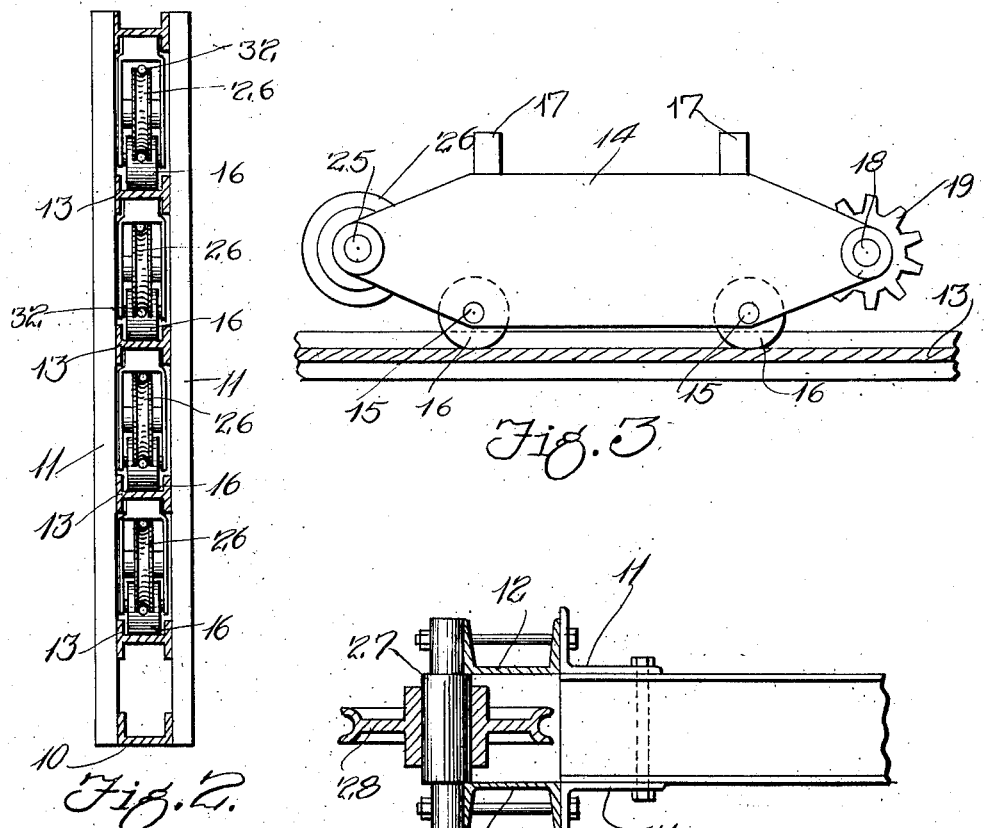
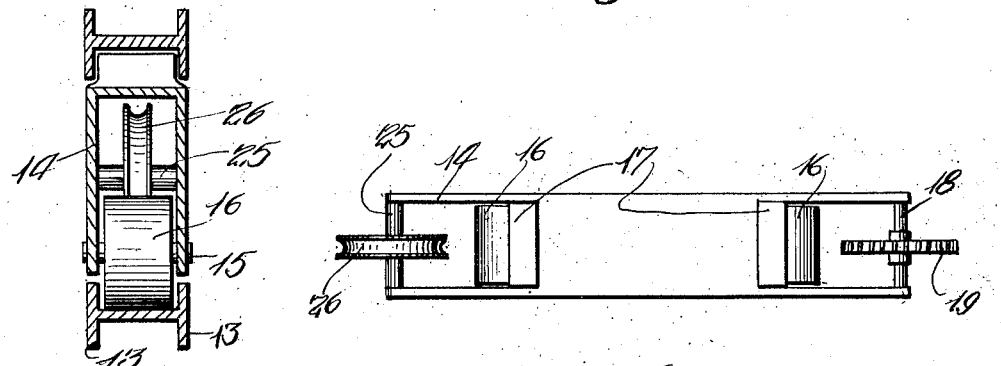
Inventor
Arthur J. Vance
By Eugene E. Brown
Attorney Patented Jan. 20, 1925.

1,523,988

UNITED STATES PATENT OFFICE.

ARTHUR J. VANCE, OF PAINESVILLE, OHIO, ASSIGNOR TO THE COE MANUFACTURING COMPANY, OF PAINESVILLE, OHIO, A CORPORATION OF OHIO.

VENEER DRIER.

Application filed August 1, 1924. Serial No. 729,619.

*To all whom it may concern:*

Be it known that I, ARTHUR J. VANCE, a citizen of the United States, residing at Painesville, in the county of Lake and State of Ohio, have invented certain new and useful Improvements in Veneer Driers, of which the following is a specification.

This invention relates to driers for veneers and other like material wherein conveyors consisting of horizontal spaced pairs of rolls are arranged in several decks, one above the other, for conveying the material through a drying chamber.

In such conveyors the drying chamber is generally quite long and the rolls within it are supported by a metallic frame which, on account of the variations in temperature in the drier, is subject to expansion and contraction to a considerable amount. The frame is made in sections and is mounted on rollers to allow for automatic expansion and contraction. Furthermore, the conveying rolls for each deck are generally driven by a sprocket chain. Now the driving mechanism must be securely anchored to the foundation at one end of the drier and the sprockets, over which the chains reverse at the opposite end, must, likewise, be carried by a framework which is secured to the foundation. Now the chains pass through the hot chamber and therefore expand and contract as the drier temperature rises or falls. In order to keep the slack in the returning chain the same for different temperatures it is necessary for the sprocket over which the chain reverses to be movable. The frame and reversing sprockets and their parts is termed the chain tightener. This invention is a means of automatically maintaining a constant tension on the slack side of the chain and automatically moving the reversing sprockets forward or backward to maintain a constant amount of slack from maximum to minimum temperature.

As above noted belt tighteners or chain tighteners have been employed heretofore, the chains for the several decks having been independently tightened. This entailed a series of screws or sets of springs or weights and the important object of the present invention is to provide a novel and improved belt tightener wherein all of the chains will be uniformly tensioned by a single tension element.

With the above and other objects in view one form of the invention will now be described in detail and afterwards particularly pointed out in the claims, reference being had to the accompanying drawings wherein:

Figure 1 is a side elevation of a belt tightener constructed in accordance with this invention, a portion of a four deck drier being shown adjacent the drier with its side wall broken away in order to illustrate the drier arrangement for the drier arrangement for the drier conveyor rolls.

Figure 2 is a section on the line 2—2 of Figure 1. Figure 3 is an enlarged side elevation of one of the carriages used herewith.

Figure 4 is an enlarged section on the line 4—4 of Figure 1.

Figure 5 is an enlarged section on the line 5—5 of Figure 1.

Figure 6 is a plan view of the carriage.

The chain tightener, in the present form, includes a frame having bottom channel members 10 provided at each end with spaced uprights 11, preferably made of angle iron and, at the end remote from the drier, channel uprights 12 are also employed. Between the uprights 11 are arranged a series of horizontally disposed I-beams 13, these beams being so arranged that their webs are horizontal and the flanges vertical. The number of these beams is one greater than the number of decks in the drier. Thus in the four deck drier shown in the present drawings five beams are employed so that each two adjacent beams form a track way and it will thus be obvious that there are the same number of track ways as there are decks in the drier.

Between each two adjacent beams is arranged a carriage which consists of a pair of flat plate sides 14 having rectangular central portions and tapered ends. Connecting these sides at their lower parts are axles 15 whereon are mounted the carriage supported wheels 16 which rest on the webs of the beams 13 between the upwardy extending portions of the beam flanges. At the top each carriage is provided with a pair of guide lugs 17 which extends upwardly between the flanges of the beam over the carriage. Thus each of the beams between the carriage exercises the double function of being a track for one carriage and a guide for the top of the carriage immediately below. At the end of each carriage adjacent the drier there is provided an axle or shaft 18 whereon is mounted a sprocket wheel 19 around which passes the drive chain 20 for the particular deck driven by said chain, the chain passing under sprockets 21 on the end journalled ends 22 of the conveyor rolls, and returning over the rollers 23 supported in the guide channels 24 of the drier. At the end of each carriage remote from the drier is a second axle or shaft 25 whereon is mounted a grooved idler wheel 26. At the ends of each of the beams, remote from the drier, on which the carriages rest there is secured to the uprights 12 shafts 27 whereon are grooved wheels 28. To the upper end of the uprights 12 is also secured a bearing bracket 29 carrying a shaft 30 whereon is mounted a grooved wheel 31. At 32 is a tension element which may, if desired, be made of wire rope. This element has one end secured to the uprights 11 adjacent the drier and is then led under and around the lower idler 28, back under and around the lower most of the grooved wheels 26 and thus to and fro until after leaving the upper wheel 26 it is carried over and down around the wheel 31, a suitable weight 33 being attached to its free end. While the weight 33 has here been shown as directly attached to the rope 32 it is obvious that an arrangement of blocks may be used so as to cause the weight to move vertically but a small distance in some cases, such an arrangement being well known and not deemed necessary to be here illustrated.

It will now be plain that any variations in the length of the chains 20 will be at once accommodated by movement of the carriage attached to that chain and if the chains do not expand evenly from any cause, with the single weight and idler pulley arrangement will take up such expansion or permit a corresponding contraction.

From the foregoing it will be obvious that any number of sprocket chains or other driving belts or ropes may thus be kept under proper tension by a single tension means.

Having thus described the invention, what is claimed as new, is:

1. A drive chain tightener for multiple deck veneer driers, consisting of a series of track ways equal in number to the decks in the drier, and alined with the driving side of the drier, a carriage on each track movable longitudinally thereof, a drive chain idler wheel on the end of each carriage adjacent the drier, a second idler at the opposite end of each carriage, other idlers at the ends of the track ways remote from the drier and between the levels of the drier decks, a single tension element led back and forth around the second and the last mentioned idlers and having one end fixedly secured, and means to exert constant tension on the remaining end of said element.

2. A drive chain tightener for multiple deck veneer driers consisting of a series of horizontally disposed tracks one more in number than the number of decks in the drier and arranged in superposed relation in alinement with the driving side of the drier, a carriage between each two adjacent tracks, wheels on the carriages supporting the same on the tracks beneath respective carriages, guides on the carriage engaging the tracks above said carriages, a drive chain idler wheel on each carriage at the end adjacent the drier, other idlers at the ends of the track ways remote from the drier and between the levels of the drier decks, a single tension element led back and forth around the second and the last mentioned idlers and having one end fixedly secured, and means to exert constant tension on the remaining end of said element.

3. A drive chain tightener for multiple deck veneer driers consisting of a series of horizontally disposed vertically spaced I-beam having their flanges vertical and webs horizontal, said beams being one more in number than the decks in the drier whereby to provide a trackway for each deck, a carriage for each trackway, supporting wheels for the carriage bearing on the web of the beam below the respective trackway, guide members on each carriage engaging between the lower portions of the flanges of the beam above the trackway of said carriage, a drive chain idler wheel on each carriage at the end adjacent the drier, other idlers at the ends of the track ways remote from the drier and between the levels of the drier decks, a single tension element led back and forth around the second and the last mentioned idlers and having one end fixedly secured, and means to exert constant tension on the remaining end of said element.

In testimony whereof I affix my signature.

ARTHUR J. VANCE.